(12) United States Patent
Madge (10) Patent No.: US 9,951,814 B2
(45) Date of Patent: Apr. 24, 2018

(54) BEARING ARRANGEMENT AND A BEARING CAGE

(71) Applicant: ROLLS-ROYCE plc, London (GB)

(72) Inventor: Jason J Madge, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/335,745

(22) Filed: Oct. 27, 2016

(65) Prior Publication Data

US 2017/0130774 A1 May 11, 2017

(30) Foreign Application Priority Data

Nov. 11, 2015 (GB) .................................. 1519892.2

(51) Int. Cl.
*F16C 33/38* (2006.01)
*F16C 33/56* (2006.01)
(Continued)

(52) U.S. Cl.
CPC .......... *F16C 33/3843* (2013.01); *B33Y 80/00* (2014.12); *F16C 33/3831* (2013.01);
(Continued)

(58) Field of Classification Search
CPC ...... F16C 33/44; F16C 33/56; F16C 33/4611; F16C 33/4623; F16C 33/3843;
(Continued)

(56) References Cited

U.S. PATENT DOCUMENTS 1,058,629 A 4/1913 Salisbury
2,838,348 A * 6/1958 Hamm ................ F16C 33/3843
384/466

(Continued)

FOREIGN PATENT DOCUMENTS

DE 102006014108 A1 9/2007
DE 102009016162 A1 10/2010
(Continued)

OTHER PUBLICATIONS

Apr. 6, 2016 Search Report issued in Great Britain Patent Application No. GB1519892.2.
(Continued)

*Primary Examiner* — Marcus Charles
(74) *Attorney, Agent, or Firm* — Oliff PLC (57) ABSTRACT

A bearing arrangement comprises a rolling element bearing assembly including a bearing cage. The bearing cage comprises an annular cage body having an inner surface defining a coaxial bore. The bearing cage has a plurality of circumferentially spaced pockets and each pocket houses a rotatable rolling element. A first annular skirt extends axially from a radially inner end of a first axial end of the cage body and at least one first support member extends radially and axially from the remote axial end of the first annular skirt to the radially outer end of annular cage body. The bearing cage is hollow and has a high stiffness to weight ratio. The bearing arrangement is particularly suitable for use for a planet gear of a planetary gearbox. The planetary gearbox may be for a gas turbine engine.

20 Claims, 4 Drawing Sheets

(51) Int. Cl.
*F16C 33/46* (2006.01)
*F16C 33/44* (2006.01)
*B33Y 80/00* (2015.01)

(52) U.S. Cl.
CPC .......... *F16C 33/44* (2013.01); *F16C 33/4611* (2013.01); *F16C 33/4623* (2013.01); *F16C 33/56* (2013.01); *F16C 2220/24* (2013.01); *F16C 2360/23* (2013.01); *F16C 2361/61* (2013.01)

(58) Field of Classification Search
CPC .............. F16C 2220/23; F16C 2361/61; F16C 33/3831; F16C 2360/23; F16C 2220/24
USPC ....... 384/490, 523, 527, 535, 537, 560, 572, 384/579, 581
See application file for complete search history.

(56) References Cited

U.S. PATENT DOCUMENTS

| | | | | |
|---|---|---|---|---|
| 3,162,493 | A * | 12/1964 | Heinz | F16C 33/3831 |
| | | | | 384/527 |
| 3,529,875 | A * | 9/1970 | McKee | F16C 33/3831 |
| | | | | 384/469 |
| 3,554,621 | A * | 1/1971 | McAllister | F16C 33/3831 |
| | | | | 384/484 |
| 3,685,877 | A * | 8/1972 | Gould | F16C 33/3843 |
| | | | | 384/470 |
| 4,073,552 | A * | 2/1978 | Christy | F16C 33/3831 |
| | | | | 384/470 |
| 4,345,799 | A | 8/1982 | Crofts | |
| 4,822,183 | A * | 4/1989 | Lederman | F16C 19/10 |
| | | | | 277/364 |
| 6,749,341 | B2 | 6/2004 | Rio | |
| 8,360,653 | B2 * | 1/2013 | Shaikh | F16C 33/416 |
| | | | | 384/504 |
| 8,790,019 | B2 * | 7/2014 | Fujiwara | F16C 33/4605 |
| | | | | 384/572 |
| 9,194,432 | B2 * | 11/2015 | Ashmore | F16C 33/6614 |
| 2014/0226928 | A1 | 8/2014 | Metrikin | |
| 2015/0043861 | A1 * | 2/2015 | Ashmore | F16C 33/38 |
| | | | | 384/572 |

FOREIGN PATENT DOCUMENTS

| | | | |
|---|---|---|---|
| EP | 2835544 A2 | 2/2015 | |
| FR | 2884188 A1 | 10/2006 | |
| GB | 1238199 A | 7/1971 | |
| GB | 1353045 A * | 5/1974 | .............. F16C 33/66 |
| WO | 92/00463 A1 | 1/1992 | |
| WO | 2012/173046 A1 | 12/2012 | |
| WO | 2014/142837 A1 | 9/2014 | |

OTHER PUBLICATIONS

Mar. 31, 2017 Search Report issued in Great Britiain Patent Application No. GB1617600.0.

* cited by examiner

BEARING ARRANGEMENT AND A BEARING CAGE

CROSS-REFERENCE TO RELATED APPLICATIONS

This application claims the benefit of United Kingdom Patent Application GB 1519892.2, filed on Nov. 11, 2015, the entire disclosure of which is hereby incorporated by reference in its entirety.

BACKGROUND

The present disclosure concerns a rolling element bearing and in particular to a rolling element bearing cage. The present disclosure concerns a roller bearing or a ball bearing, and in particular concerns a roller bearing cage or a ball bearing cage. The present disclosure is more particularly concerned with rolling element bearings for a planetary gearbox.

The bearing cage of a rolling element bearing controls the position of the rolling elements to avoid neighbouring rolling elements contacting and damaging each other. A bearing cage must have suitable strength and rigidity and must have a minimum weight. These attributes are of particular concern in the case of roller bearings used for the planet gears of high speed planetary gearboxes. The loads imparted due to rotation are potentially very large and therefore a reduction in the mass of the bearing cage reduces the loads experienced by the bearing cage. A loss of rigidity of the bearing cage may compromise the bearing cage pilot load bearing capacity producing wear and reliability problems.

A conventional bearing cage designed for high pilot loads has wide pilot lands, or skirts, extending axially from the cage body to support a wide film of lubricant, oil, with a high load capacity. The bearing cage is essentially a solid ring and it is difficult to provide adequate stiffness across the full axial width of the skirts and cage body without adding excessive levels of mass, which increases the loads further. The solid bearing cage has a relatively low stiffness to weight ratio which may result in bending of the skirts due to journal film loads and/or bending of the cage due to the applied loads.

A conventional bearing cage with a relatively low stiffness to mass ratio compromises the ability to provide adequate pilot land journal capacity, e.g. provide skirts with adequate axial length. If a uniformly stiff bearing cage is provided the mass of the bearing cage is too high resulting in increased loading. If a relatively light weight bearing cage is provided there is a compromise in the alignment of the journal bearing surfaces, which also reduces the load bearing capacity. These factors are particularly important in bearing cages for planet gears of high speed planetary gearboxes, which are subjected to high lateral accelerations.

Accordingly the present disclosure seeks to provide a bearing cage and a bearing arrangement which reduces, or overcomes, the above mentioned problems.

SUMMARY

According to a first aspect of the invention there is provided a rolling element bearing cage, the rolling element bearing cage comprising an annular cage body having an inner surface defining a coaxial bore, the bearing cage having a plurality of circumferentially spaced pockets, each pocket housing a rotatable rolling element, a first annular skirt extending axially from a radially inner end of a first axial end of the cage body and at least one first support member extending radially and axially from the remote axial end of the first annular skirt to the radially outer end of annular cage body.

According to a second aspect of the invention there is provided a bearing arrangement comprising a rolling element bearing assembly including a bearing cage, the bearing cage comprising an annular cage body having an inner surface defining a coaxial bore, the bearing cage having a plurality of circumferentially spaced pockets, each pocket housing a rotatable rolling element, a first annular skirt extending axially from a radially inner end of a first axial end of the cage body and at least one first support member extending radially and axially from the remote axial end of the first annular skirt to the radially outer end of annular cage body.

The at least one first support member may be annular such that a first annular chamber is defined by the annular cage body, the first annular skirt and the first annular support member.

The first annular chamber may contain a low density filler. The low density filler may comprise a foam. The foam may be a metallic foam.

The at least one first support member may comprise a plurality of members.

A second annular skirt may extend axially from the radially inner end of a second axial end of the cage body and at least one second support member extending radially and axially from the remote axial end of the second annular skirt to the radially outer end of annular cage body.

The at least one second support member may be annular such that a second annular chamber is defined by the annular cage body, the second annular skirt and the second annular support member.

The second annular chamber may contain a low density filler. The low density filler may comprise a foam. The foam may be a metallic foam.

The at least one second support member may comprise a plurality of members.

The cage body, the first annular skirt and the at least one first support member may be a monolithic structure. The cage body, the first annular skirt, the at least one first support member and the foam in the first annular chamber may be a monolithic structure. The cage body, the first annular skirt, the at least one first support member, the second annular skirt and the at least one second support member may be a monolithic structure. The cage body, the first annular skirt, the at least one first support member, the foam in the first annular chamber, the second annular skirt, the at least one second support member and the foam in the second annular chamber may be a monolithic structure. The monolithic structure may be produced by additive layer manufacture, e.g. direct laser deposition, laser powder bed, selective laser sintering etc.

The rolling elements may be roller bearings or ball bearings.

The bearing arrangement may be arranged between a shaft and a stator structure. The bearing arrangement may be arranged between a first shaft and a second shaft. The bearing arrangement may be arranged between a planet gear and a planet gear carrier of a planetary gearbox arrangement. The bearing arrangement may be arranged between a star gear and a star gear carrier of a star gearbox arrangement.

The bearing arrangement may be a bearing arrangement for a gas turbine engine, a turbomachine, a steam turbine or an internal combustion engine.

The skilled person will appreciate that except where mutually exclusive, a feature described in relation to any one of the above aspects of the invention may be applied mutatis mutandis to any other aspect of the invention.

BRIEF DESCRIPTION OF THE DRAWINGS

Embodiments of the invention will now be described by way of example only, with reference to the figures, in which.

FIG. is a part sectional side view of a geared turbofan gas turbine engine having a bearing arrangement according to the present disclosure.

DETAILED DESCRIPTION

Figure 1:
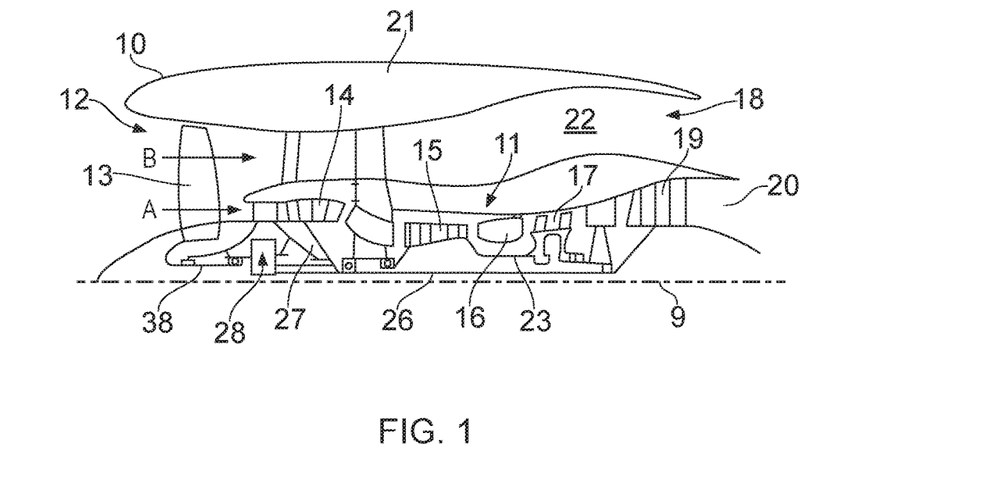
Figure 2:
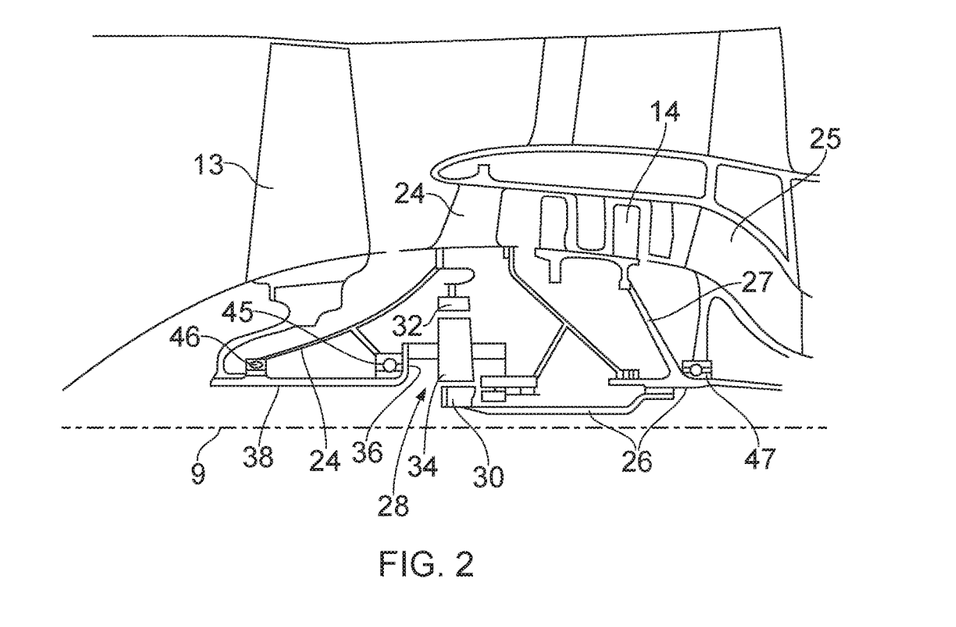
FIG. 2 is an enlarged part sectional side view of a portion of the geared turbofan gas turbine engine shown in FIG. 1.

With reference to FIGS. 1 and 2, a geared turbofan gas turbine engine is generally indicated at 10, having a principal and rotational axis 9. The engine 10 comprises, in axial flow series, an air intake 12, a propulsive fan 13, an intermediate-pressure, or booster, compressor 14, a high-pressure compressor 15, combustion equipment 16, a high-pressure turbine 17, a low-pressure turbine 19 and a core exhaust nozzle 20. The intermediate-pressure compressor 14, the high-pressure compressor 15, the combustion equipment 16, the high-pressure turbine 17 and the low-pressure turbine 19 form a core engine 11. A nacelle 21 generally surrounds the engine 10 and defines the intake 12, a bypass duct 22 and a bypass exhaust nozzle 18.

The gas turbine engine 10 works in the conventional manner so that air entering the intake 12 is accelerated by the fan 13 to produce two air flows: a first air flow A into the intermediate-pressure compressor 14 and a second air flow B which passes through the bypass duct 22 to provide the majority of the propulsive thrust. The intermediate-pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high and low-pressure turbines 17, 19 before being exhausted through the core nozzle 20 to provide additional propulsive thrust. The high-pressure turbine 17 drives the high-pressure compressor 15 by a shaft 23. The low-pressure turbine 19 drives the intermediate-pressure compressor 14 directly via shafts 26 and 27. The low-pressure turbine 19 drives the fan 13 indirectly via the shaft 26, a gearbox 28 and a shaft 38. The gearbox 28 comprises a sun gear 30, an annulus gear 32, a plurality of planet gears 34 and a planet gear carrier 36. The sun gear 30 meshes with the planet gears 34 and the planet gears 32 mesh with the annulus gear 32. The planet gear carrier 36 constrains the planet gears 34 to precess around the sun gear 30 in synchronicity whilst enabling each planet gear 34 to rotate about its own axis independently. The planet gear carrier 36 is coupled via the shaft 38 to the fan 13 in order to drive its rotation about the engine axis 9. The annulus gear 32 is coupled to a static structure 24. The axes of the planet gears 34 and the axis of the planet gear carrier 36 are parallel to the engine axis 9.

Figure 3:
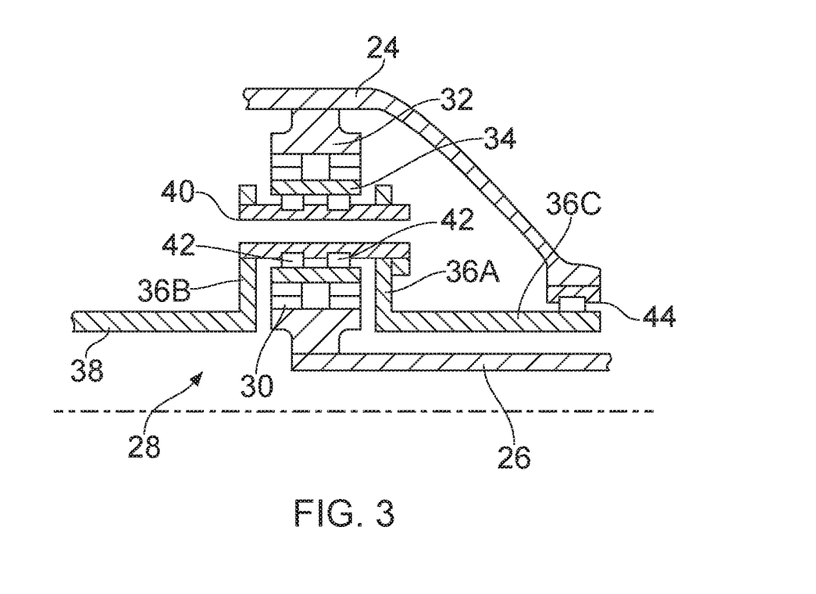
FIG. 3 is an enlarged cross-sectional view though the gearbox shown in FIG. 2 having a bearing arrangement according to the present disclosure.

The gearbox 28 is shown more clearly in FIG. 3 and the planet gear carrier 36 comprises a first ring 36A, a second ring 36B spaced axially from the first ring 36A and a plurality of circumferentially spaced axles 40 which extend axially between the first ring 36A and the second ring 36B. Each planet gear 34 is rotatably mounted on a respective one of the axles 40 and an annular extension, e.g. an extension shaft, 36C extends axially from the first ring 36A. Each planet gear 34 is rotatably mounted in the planet gear carrier 36 by at least one planet gear bearing 42. The extension shaft 36C is rotatably mounted in the static structure 24 by a roller bearing 44, the shaft 38 is rotatably mounted in the static structure 24 by a ball bearing 45 and a roller bearing 46 axially spaced from the ball bearing 45. The shaft 26 is rotatably mounted in further static structure 25 by a ball bearing 47.

In this particular embodiment each planet gear 34 is rotatably mounted on the planer gear carrier 36 by two roller bearings 42. The planet gear bearings 42 of the gearbox arrangement 28 of FIG. 3 may be provided with a bearing cage as described with reference to FIG. 4, 5, 6 or 7.

Figure 4:
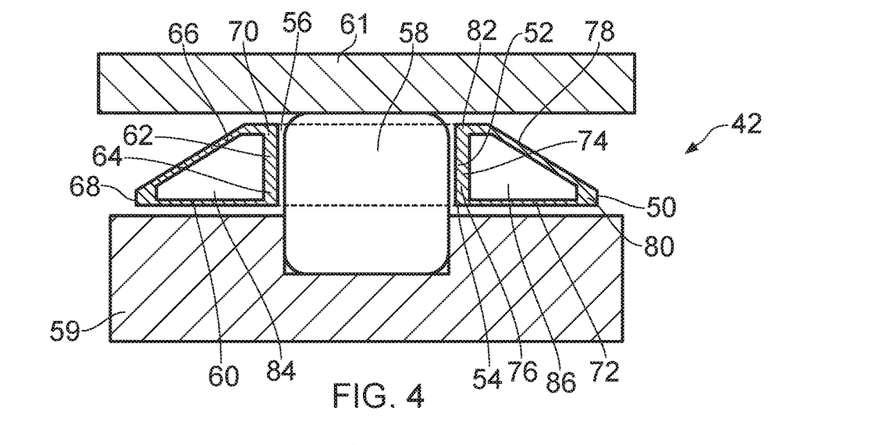
FIG. 4 is a further enlarged cross-sectional view through a bearing arrangement according to the present disclosure.

A bearing arrangement according to the present disclosure is shown more clearly in FIG. 4. The bearing arrangement 42 comprises a rolling element bearing assembly including a bearing cage 50, the bearing cage 50 comprises an annular cage body 52 having an inner surface 54 defining a coaxial bore, the bearing cage 50 having a plurality of circumferentially spaced pockets 56 and each pocket 56 housing a rotatable rolling element 58. A first annular skirt 60 extends axially from a radially inner end 64 of a first axial end 62 of the cage body 52 and at least one first support member 66 extends radially and axially from the remote axial end 68 of the first annular skirt 60 to the radially outer end 70 of the first axial end 62 of the annular cage body 52. A second annular skirt 72 extends axially from the radially inner end 76 of a second axial end 74 of the cage body 52 and at least one second support member 78 extends radially and axially from the remote axial end 80 of the second annular skirt 72 to the radially outer end 82 of the second axial end 74 of the annular cage body 52. The rolling elements 58 and the bearing cage 50 are positioned radially between an inner race 59 and an outer race 61 and the rolling elements 58 are rollers.

The at least one first support member 66 is annular such that a first annular chamber 84 is defined by the annular cage body 52, the first annular skirt 60 and the first annular support member 66. In this example the first annular chamber 84 is empty. Similarly, the at least one second support member 78 is annular such that a second annular chamber 86 is defined by the annular cage body 52, the second annular skirt 72 and the second annular support member 78 and the second annular chamber 86 is empty.

Thus, it clear that the annular cage body 52, the first annular skirt 60, the first annular support member 66, the second annular skirt 72 and the second annular support member 78 together form a hollow bearing cage 50 with two annular chambers 84 and 86. This hollow bearing cage 50 has a high stiffness to weight ratio. The first and second annular support members 66 and 78 form a structural skin which utilises material more effectively against bending deflections which reduce the cage pilot journal bearing capacity of the first and second annular skirts of conventional bearing cage designs. The bearing cage 50 may be tuned to provide a favourable distortion behaviour across the pilot land areas, e.g. across the axial length of the first and second annular skirts 60 and 72. The bearing cage 50 is particularly useful for a rolling element bearing which experiences very high lateral accelerations such as rolling element bearings used for planet gears in a planetary gearbox in which case the inner race 59 is provided on the axle 40 and the outer race 61 is provided on the planet gear 34. The bearing cage may also be used in conventional rolling element bearings in which a high stiffness to mass ratio may alleviate cage dynamics issues or simply to reduce the weight of the bearing cage.

In this example the cage body 52, the first annular skirt 60, the at least one first annular support member 66, the foam 88 in the first annular chamber 84, the second annular skirt 72, the at least one second annular support member 78 and the foam 90 in the second annular chamber 86 is a monolithic structure, e.g. an integral structure or one piece structure. The monolithic structure may be produced by additive layer manufacture, e.g. direct laser deposition, laser powder bed, selective laser sintering etc.

Figure 5:
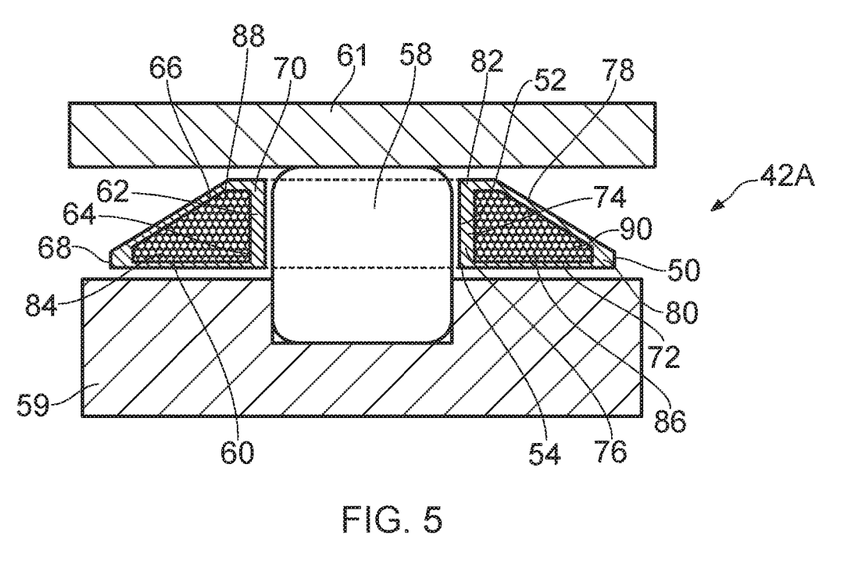
FIG. 5 is a further enlarged cross-sectional view through an alternative bearing arrangement according to the present disclosure.

A further bearing arrangement according to the present disclosure is shown more clearly in FIG. 5. The bearing arrangement 42A shown in FIG. 5 is substantially the same as that shown in FIG. 4, and like parts are denoted by like numerals. FIG. 5 differs in that the first and second annular chambers 84 and 86 contain a low density filler 88 and 90 respectively. The low density filler 88 and 90 comprises a foam, for example a metallic foam.

In this example the cage body 52, the first annular skirt 60, the at least one first annular support member 66, the foam 88 in the first annular chamber 64, the second annular skirt 72, the at least one second annular support member 78 and the foam 90 in the second annular chamber 86 is a monolithic structure, e.g. an integral structure or one piece structure. The monolithic structure may be produced by additive layer manufacture, e.g. direct laser deposition, laser powder bed, selective laser sintering etc.

Figure 6:
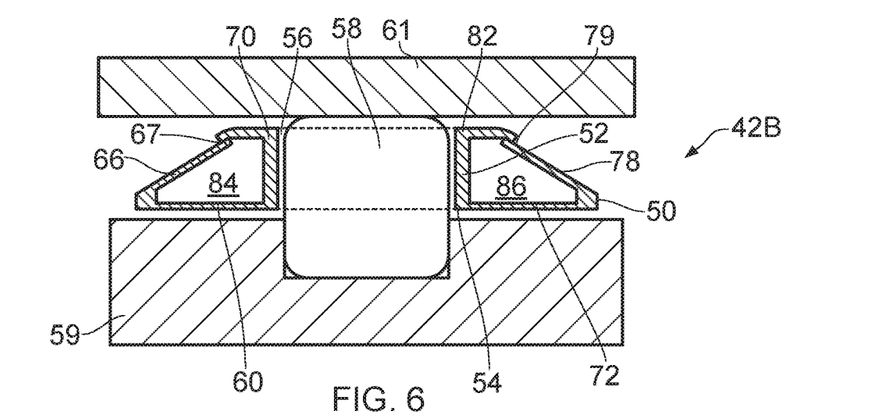
FIG. 6 is a further enlarged cross-sectional view through a further bearing arrangement according to the present disclosure.

A further bearing arrangement according to the present disclosure is shown more clearly in FIG. 6. The bearing arrangement 42B shown in FIG. 6 is substantially the same as that shown in FIG. 4, and like parts are denoted by like numerals. FIG. 6 differs in that the radially outer ends 67 and 79 of the first and second annular support members 66 and 78 respectively are not integrally attached to the radially outer ends 70 and 82 of the first and second axial ends 62 and 74 respectively of the annular cage body 52. In this example the radially outer ends 67 and 79 of the first and second annular support members 66 and 78 respectively are located radially underneath the radially outer ends 70 and 82 of the first and second axial ends 62 and 74 respectively of the annular cage body 52.

The first annular skirt 60 and the first annular support 66 are formed from a single piece and the first annular support 66 is rolled over or upset to its final position. Similarly, the second annular skirt 72 and the second annular support 78 are formed from a single piece and the second annular support 78 is rolled over or upset to its final position. The radially outer ends 67 and 79 of the first and second annular support members 66 and 78 may be welded, or brazed or bonded to the radially outer ends 70 and 82 of the first and second axial ends 62 and 74 respectively of the annular cage body 52.

Figure 7:
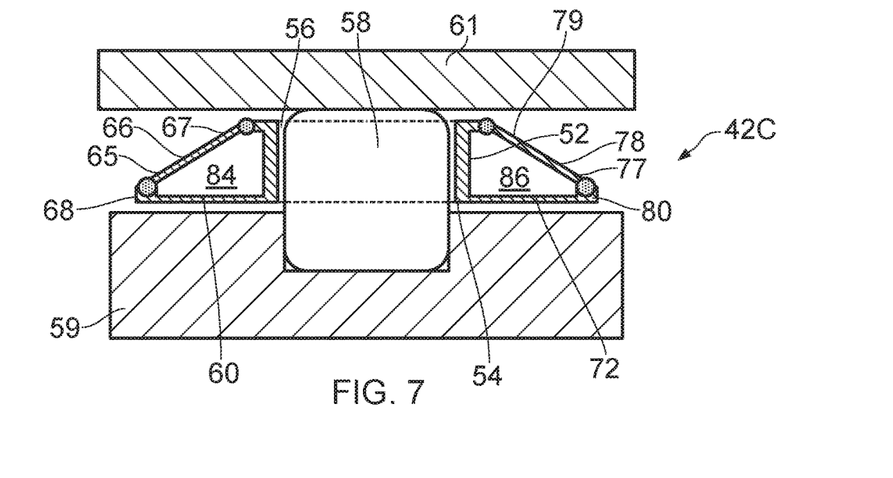
FIG. 7 is a further enlarged cross-sectional view through another bearing arrangement according to the present disclosure.

Another bearing arrangement according to the present disclosure is shown more clearly in FIG. 7. The bearing arrangement 42C shown in FIG. 7 is substantially the same as that shown in FIG. 4, and like parts are denoted by like numerals. FIG. 7 differs in that the radially outer ends 67 and 79 of the first and second annular support members 66 and 78 respectively are welded, or brazed or bonded to the radially outer ends 70 and 82 of the first and second axial ends 62 and 74 respectively of the annular cage body 52. Similarly, the radially inner ends 65 and 77 of the first and second annular support members 66 and 78 respectively are welded, or brazed or bonded to the remote axial ends 68 and 80 of the first and second annular skirts 60 and 72 respectively.

Figure 8:
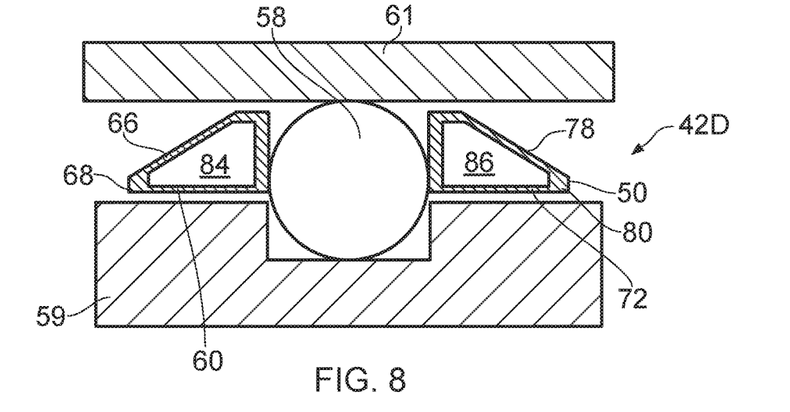
FIG. 8 is a further enlarged cross-sectional view through another bearing arrangement according to the present disclosure.

Another bearing arrangement according to the present disclosure is shown more clearly in FIG. 8. The bearing arrangement 42D shown in FIG. 8 is substantially the same as that shown in FIG. 4, and like parts are denoted by like numerals. FIG. 8 differs in that the rolling elements 58 are balls.

Figure 9:
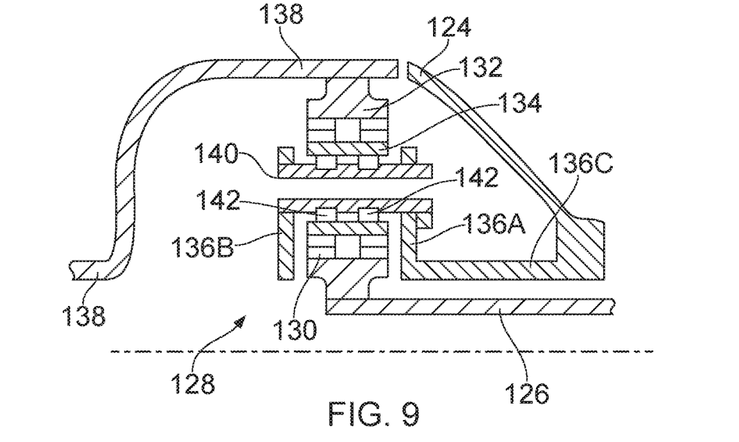
FIG. 9 is an enlarged cross-sectional view through an alternative gearbox having a bearing arrangement according to the present disclosure.

FIG. 9 shows an arrangement in which the low-pressure turbine 19 drives the fan 13 indirectly via the shaft 126, a gearbox 128 and a shaft 138. The gearbox 128 comprises a sun gear 130, an annulus gear 132, a plurality of star gears 134 and a star gear carrier 136. The sun gear 130 meshes with the star gears 134 and the star gears 134 mesh with the annulus gear 132. The star gear carrier 136 enabling each star gear 134 to rotate about its own axis independently. The star gear carrier 136 is coupled to a static structure 124. The annulus gear 132 is coupled via the shaft 138 to the fan 13 in order to drive its rotation about the engine axis 9. The axes of the star gears 134 are parallel to the engine axis 9. The star gear carrier 136 comprises a first ring 136A, a second ring 136B spaced axially from the first ring 136A and a plurality of circumferentially spaced axles 140 which extend axially between the first ring 136A and the second ring 136B. Each star gear 134 is rotatably mounted on a respective one of the axles 140 and an annular extension 136C extends axially from the first ring 136A. Each star gear 134 is rotatably mounted in the star gear carrier 136 by at least one planet gear bearing 142. The annular extension 1360 is secured to the static structure 124. In this particular embodiment each star gear 134 is rotatably mounted on the star gear carrier 136 by two roller bearings 142. The star gear bearings 142 of the gearbox arrangement 128 of FIG. 9 may be provided with a bearing cage as described with reference to FIG. 4, 5, 6 or 7.

Figure 10:
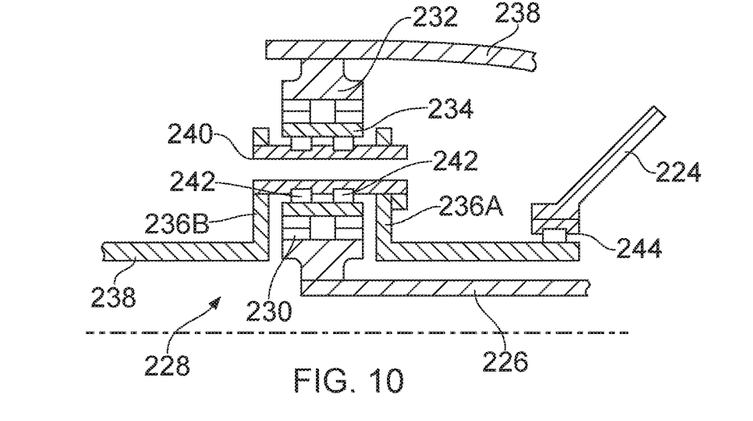
FIG. 10 is an enlarged cross-sectional view through a further gearbox having a bearing arrangement according to the present disclosure.

FIG. 10 shows an arrangement in which the low-pressure turbine 19 drives two fans indirectly via the shaft 226, a gearbox 228 and shaft 238A and 238B. The gearbox 228 comprises a sun gear 230, an annulus gear 232, a plurality of planet gears 234 and a planet gear carrier 236. The sun gear 230 meshes with the planet gears 234 and the planet gears 234 mesh with the annulus gear 232. The planet gear carrier 236 enabling each planet gear 234 to rotate about its own axis independently. The planet gear carrier 236 is coupled via the shaft 238A to a first propulsor (not shown) and the annulus gear 232 is coupled via the shaft 238B to a second propulsor (not shown) in order to drive their rotation about the engine axis 9. The propulsors are driven to rotate in opposite rotational directions. The axes of the planet gears 234 are parallel to the engine axis 9. The planet gear carrier 236 comprises a first ring 236A, a second ring 236B spaced axially from the first ring 236A and a plurality of circumferentially spaced axles 240 which extend axially between the first ring 236A and the second ring 236B. Each planet gear 234 is rotatably mounted on a respective one of the axles 240 and an annular extension 236C extends axially from the first ring 236A. Each planet gear 234 is rotatably mounted in the planet gear carrier 236 by at least one planet gear bearing 242. The annular extension 236C is rotatably mounted in the static structure 224 by a bearing 244. In this particular embodiment each planet gear 234 is rotatably mounted on the planet gear carrier 236 by two roller bearings. The planet gear bearings 242 of the gearbox arrangement 228 of FIG. 10 may be provided with a bearing cage as described with reference to FIG. 4, 5, 6 or 7.

Although the present disclosure has been described with reference to the use of a bearing arrangement for a planet gear or star gear it may also be used for example for a bearing arrangement between a shaft and static structure for example the roller bearing 45 between the shaft 36C and the static structure 24 in FIG. 3 and/or the roller bearing 46 and/or the ball bearing 45 between the shaft 38 and the static structure 24 in FIG. 1 and/or for the ball bearing 47 between the shaft 26 and the static structure 25 of FIG. 1.

Although the present disclosure has been described with reference to a single first annular support member and a single annular second support member it may be possible to provide a plurality of circumferentially spaced first support members and/or a plurality of circumferentially spaced second support members.

Although the present disclosure has been described with reference to first and second annular skirts and at least one first support member and at least one second support member on the bearing cage it may be possible to provide only a single annular skirt and at least one first support member on the bearing cage.

The rolling elements may be roller bearings or ball bearings.

The bearing arrangement may be arranged between a shaft and a stator structure. The bearing arrangement may be arranged between a first shaft and a second shaft. The bearing arrangement may be arranged between a planetary gear and a planetary gear carrier of a planetary gearbox arrangement. The bearing arrangement may be arranged between a star gear and a star gear carrier of a star gearbox arrangement.

The bearing arrangement may be a bearing arrangement for a gas turbine engine, a turbomachine, a steam turbine or an internal combustion engine.

In each of the arrangements described above the sun gear, the annulus gear, the planet gear carrier, or star gear carrier, and the shaft are coaxial.

As described above, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

Alternatively, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

Alternatively, the gas turbine engine comprises a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

Alternatively the gas turbine engine may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

Alternatively, the gas turbine engine comprises a first propulsor, a second propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine, a low-pressure turbine and a free power turbine, the high-pressure turbine is arranged to directly drive the high-pressure compressor, the low-pressure turbine is arranged to directly drive the low-pressure compressor and the free power turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine and a low-pressure turbine, the high-pressure turbine is arranged to directly drive the high-pressure compressor, the low-pressure turbine is arranged to directly drive the low-pressure compressor and the low-pressure turbine is arranged to drive the first propulsor and the second propulsor via a gearbox.

The sun gear may be driven by a low-pressure turbine, the annulus gear may be secured to static structure and the planet gear carrier may be arranged to drive a propulsor.

The sun gear may be driven by the low-pressure turbine, the planet gear carrier may be secured to static structure and the annulus gear may be arranged to drive a propulsor. In this arrangement the planet gears are termed star gears and the annular extension of the planet gear carrier is secured to the static structure. In this arrangement each planet gear rotates about its own axis and the planet gear carrier does not rotate about the engine axis. The axes of the planet gears are parallel to the engine axis.

The planet gear carrier may be driven by the low-pressure turbine, the sun gear may be secured to static structure and the annulus gear may be arranged to drive a propulsor.

The sun gear may be driven by the low-pressure turbine, the planet gear carrier may be arranged to drive a first propulsor and the annulus gear may be arranged to drive a second propulsor.

The propulsor may be a fan or a propeller.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The project leading to this application has received funding from the Clean Sky 2 Joint Undertaking under the European Union's Horizon 2020 research and innovation programme under grant reference No. CS2-ENG-GAM-2014-2015-01.

The invention claimed is:

1. A bearing arrangement comprising a rolling element bearing assembly including a bearing cage, the bearing cage comprising an annular cage body having an inner surface defining a coaxial bore, the bearing cage having a plurality of circumferentially spaced pockets, each pocket housing a rotatable rolling element, a first annular skirt extending axially from a radially inner end of a first axial end of the cage body and at least one first support member extending radially and axially from the remote axial end of the first annular skirt to the radially outer end of annular cage body.

2. A bearing arrangement as claimed in claim 1 wherein the at least one first support member is annular such that a first annular chamber is defined by the annular cage body, the first annular skirt and the first annular support member.

3. A bearing arrangement as claimed in claim 2 wherein the cage body, the first annular skirt and the at least one first support member is a monolithic structure.

4. A bearing arrangement as claimed in claim 3 wherein the monolithic structure is produced by additive layer manufacture.

5. A bearing arrangement as claimed in claim 4 wherein the monolithic structure is produced by a method selected from the group consisting of direct laser deposition, laser powder bed and selective laser sintering.

6. A bearing arrangement as claimed in claim 2 wherein the first annular chamber contains a low density filler.

7. A bearing arrangement as claimed in claim 6 wherein the low density filler comprises a foam.

8. A bearing arrangement as claimed in claim 7 wherein the cage body, the first annular skirt, the at least one first support member and the foam in the first annular chamber is a monolithic structure.

9. A bearing arrangement as claimed in claim 1 wherein a second annular skirt extends axially from the radially inner end of a second axial end of the cage body and at least one second support member extending radially and axially from the remote axial end of the second annular skirt to the radially outer end of annular cage body.

10. A bearing arrangement as claimed in claim 9 wherein the at least one second support member is annular such that a second annular chamber is defined by the annular cage body, the second annular skirt and the second annular support member.

11. A bearing arrangement as claimed in claim 10 wherein the cage body, the first annular skirt, the at least one first support member, the second annular skirt and the at least one second support member is a monolithic structure.

12. A bearing arrangement as claimed in claim 10 wherein the second annular chamber contains a low density filler.

13. A bearing arrangement as claimed in claim 9 wherein the at least one second support member comprises a plurality of members.

14. A bearing arrangement as claimed in claim 12 wherein the low density filler comprises a foam.

15. A bearing arrangement as claimed in claim 14 wherein the cage body, the first annular skirt, the at least one first support member, the foam in the first annular chamber, the second annular skirt, the at least one second support member and the foam in the second annular chamber is a monolithic structure.

16. A bearing arrangement as claimed in claim 1 wherein the at least one first support member comprises a plurality of members.

17. A bearing arrangement as claimed in claim 1 wherein the rolling elements are selected from the group consisting of roller bearings and ball bearings.

18. A bearing arrangement as claimed in claim 1 wherein the bearing arrangement is arranged between a shaft and a further component, the further component is selected from the group consisting of a stator structure and a second shaft.

19. A bearing arrangement as claimed in claim 1 wherein the bearing arrangement is arranged between a planet gear and a planet gear carrier of a planetary gearbox arrangement.

20. A rolling element bearing cage, the rolling element bearing cage comprising an annular cage body having an inner surface defining a coaxial bore, the bearing cage having a plurality of circumferentially spaced pockets, each pocket housing a rotatable rolling element, a first annular skirt extending axially from a radially inner end of a first axial end of the cage body and at least one first support member extending radially and axially from the remote axial end of the first annular skirt to the radially outer end of annular cage body.

* * * * *